US012548708B2

(12) United States Patent
Moon et al.

(10) Patent No.: US 12,548,708 B2
(45) Date of Patent: Feb. 10, 2026

(54) LOW-LOSS PLANAR SPIRAL COIL

(71) Applicant: ELECTRONICS AND TELECOMMUNICATIONS RESEARCH INSTITUTE, Daejeon (KR)

(72) Inventors: Jung Ick Moon, Daejeon (KR); Gwangzeen Ko, Daejeon (KR); Sang-Won Kim, Daejeon (KR); Seong-Min Kim, Daejeon (KR); Je Hoon Yun, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 875 days.

(21) Appl. No.: 17/868,913

(22) Filed: Jul. 20, 2022

(65) Prior Publication Data

US 2023/0120470 A1 Apr. 20, 2023

(30) Foreign Application Priority Data

Oct. 20, 2021 (KR) ........................ 10-2021-0140292

(51) Int. Cl.
*H01F 27/28* (2006.01)

(52) U.S. Cl.
CPC ................................ *H01F 27/2823* (2013.01)

(58) Field of Classification Search
CPC .................................................... H01F 27/2823
See application file for complete search history.

(56) References Cited

U.S. PATENT DOCUMENTS 7,370,403 B1 * 5/2008 Hsu ..................... H01F 17/0006 336/200
8,466,375 B2 6/2013 Cho et al.
9,035,423 B1 * 5/2015 Tsukahara ................ H10D 1/20 257/531
2006/0001520 A1 * 1/2006 Kaji ...................... H01F 41/041 257/E21.022

(Continued)

FOREIGN PATENT DOCUMENTS

JP 2019-186235 A 10/2019
KR 10-1584917 B1 1/2016

(Continued)

OTHER PUBLICATIONS

Williams B. Kuhn et al., "Analysis of Current Crowding Effects in Multitum Spiral Inductors", IEEE Transactions on Microwave Theory and Techniques, vol. 49, No. 1, Jan. 2001.

*Primary Examiner* — Malcolm Barnes
(74) *Attorney, Agent, or Firm* — LRK PATENT LAW FIRM

(57) ABSTRACT

Provided is a low-loss planar spiral coil which may include a conductive wire wound N turns, and a conductive wire corresponding to each number of turns may be formed in a way that an inner surface, close to a center of the spiral coil, and an outer surface, located on an opposite side of the inner surface, have different heights from each other based on a flat lower surface, and may be formed in way that a vertical cross-section of an upper surface connecting an uppermost end of the inner and outer surfaces has a constant height variation.

11 Claims, 4 Drawing Sheets

(56) References Cited

U.S. PATENT DOCUMENTS

| | | | | |
|---|---|---|---|---|
| 2012/0019075 | A1 | 1/2012 | Cho et al. | |
| 2014/0152118 | A1 | 6/2014 | Kim et al. | |
| 2019/0013145 | A1* | 1/2019 | Ohkubo | H01F 17/04 |
| 2019/0088402 | A1* | 3/2019 | Kim | H01F 17/0013 |
| 2019/0115142 | A1* | 4/2019 | Kim | H01F 41/046 |
| 2019/0259522 | A1* | 8/2019 | Kim | H01F 27/24 |

FOREIGN PATENT DOCUMENTS

| | | | | |
|---|---|---|---|---|
| KR | 10-2018-0022419 | A | 3/2018 | |
| KR | 10-2019-0077933 | A | 7/2019 | |
| KR | 102150565 | B1 * | 9/2020 | H01F 5/003 |

* cited by examiner

LOW-LOSS PLANAR SPIRAL COIL

CROSS-REFERENCE TO RELATED APPLICATION

This application claims the benefit of Korean Patent Application No. 10-2021-0140292 filed on Oct. 20, 2021, in the Korean Intellectual Property Office, the entire disclosure of which is incorporated herein by reference for all purposes.

BACKGROUND

1. Field of the Invention

One or more example embodiments relate to a low-loss planar spiral coil, and, more particularly, to a method of improving the performance of the coil by designing it in such a way that the resistance of the coil caused by eddy currents is reduced.

2. Description of Related Art

A coil is an essential element not only in wireless charging technology using a magnetic field but also in designing inductors of general circuits. In particular, since a planar spiral coil for system miniaturization uses a printed circuit board (PCB), metal thickness (or height) is manufactured to be very thin, thus having a small cross-sectional area. Therefore, in order to reduce the high resistance caused by the small cross-sectional area, the height of the metal must be increased, but since it is difficult to manufacture metal with a thickness of hundreds of micrometers or greater due to characteristics of a printed circuit board, various efforts are being made such as adjusting the width or pitch of each turn constituting the coil and increasing the plating thickness of the metal (nickel, silver, or gold) in the post-processing process.

The resistance of a spiral coil increases not only due to the skin effect according to frequency, but also due to the proximity effect caused by high charge density concentrated at the edge of each turn where the pitch between turns is reduced, and due to inconsistency in current distribution formed due to eddy current caused as a reaction to a magnetic field occurring in the inductor, incident vertically on the metal surface of each turn.

Recently, with the development of three-dimensional (3D) printing technology using copper, it has become possible to produce metal models of various structures. When such technology is applied to develop a planar spiral coil, various coil models with less loss than existing models can be designed.

Therefore, in recent years the development of a low-loss planar spiral coil using such technology has been required.

SUMMARY

Example embodiments provide a low-loss planar spiral coil configured to reduce a resistance of the coil caused by eddy currents, by making a shape of a conductive wire constituting the spiral coil have various structures.

A spiral coil according to an example embodiment of the present disclosure may include a conductive wire wound N turns, and a conductive wire corresponding to each number of turns may be formed in a way that an inner surface, close to a center of the spiral coil, and an outer surface, located on an opposite side of the inner surface, have a different height from each other, based on a flat lower surface, and may be formed in a way that a vertical cross-section of an upper surface connecting an uppermost end of the inner and outer surfaces has a constant height variation.

The conductive wire may have an inner surface of the spiral coil formed to be higher than an outer surface of the same.

The conductive wire may have an inner surface of the spiral coil formed to be lower than an outer surface of the same.

A height difference between an inner surface and an outer surface of the spiral coil may be proportional to a width of the conductive wire.

A spiral coil according to an example embodiment of the present disclosure may include a conductive wire wound N turns, and the conductive wire corresponding to each number of turns may be formed in a way that an inner surface, close to a center of the spiral coil, and an outer surface, located on an opposite side of the inner surface have a different height from each other based on a flat lower surface, and may be formed in a way that a vertical cross-section of an upper surface connecting an uppermost end of the inner and outer surfaces has a variable height variation.

The conductive wire may have an inner surface of the spiral coil formed to be higher than an outer surface of the same.

The conductive wire may have an inner surface of the spiral coil formed to be lower than an outer surface of the same.

The height difference between an inner surface and an outer surface of the spiral coil may be proportional to the width of the conductive wire.

A spiral coil according to an example embodiment of the present disclosure may include a conductive wire wound N turns, and the conductive wire corresponding to each number of turns may be formed in a way that an inner surface, close to a center of the spiral coil, and an outer surface, located on an opposite side of the inner surface have a different height from each other based on an uneven bottom surface, and may be formed in a way that a vertical cross-section of an upper surface connecting an uppermost end of the inner and outer surfaces and a vertical cross-section of a bottom surface connecting a lowermost end of the inner and outer surfaces have a variable height variation.

The conductive wire may have an inner surface of the spiral coil formed to be higher than an outer surface of the same.

The conductive wire may have an inner surface of the spiral coil formed to be lower than an outer surface of the same.

The height difference between an inner surface and an outer surface of the spiral coil may be proportional to the width of the conductive wire.

Additional aspects of example embodiments will be set forth in part in the description which follows and, in part, will be apparent from the description, or may be learned by practice of the disclosure.

According to example embodiments, a low-loss planar spiral coil configured to reduce the resistance of a coil caused by eddy currents may be provided, by making the shape of the conductive wire constituting the spiral coil have various structures.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1A:
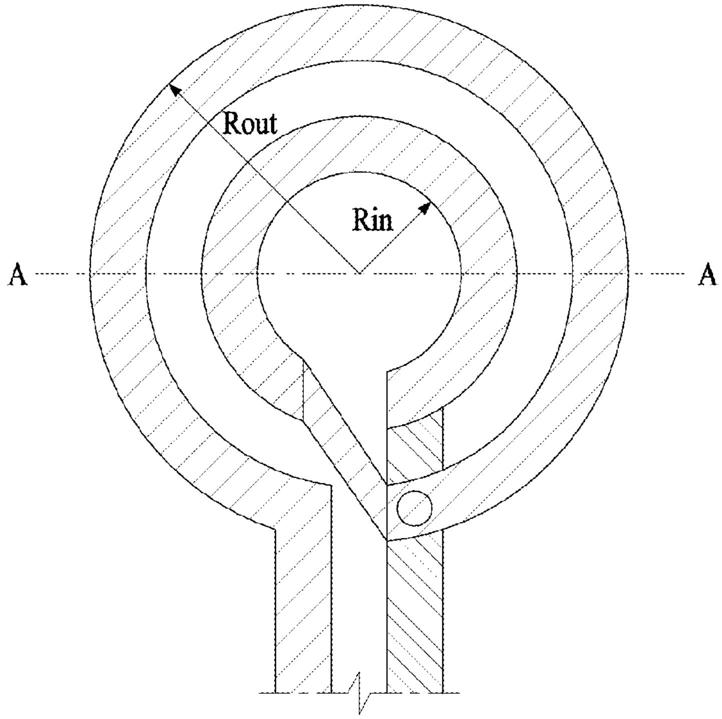
FIGS. 1A and 1B illustrate a structure of a spiral coil according to an example embodiment.
Figure 1B:
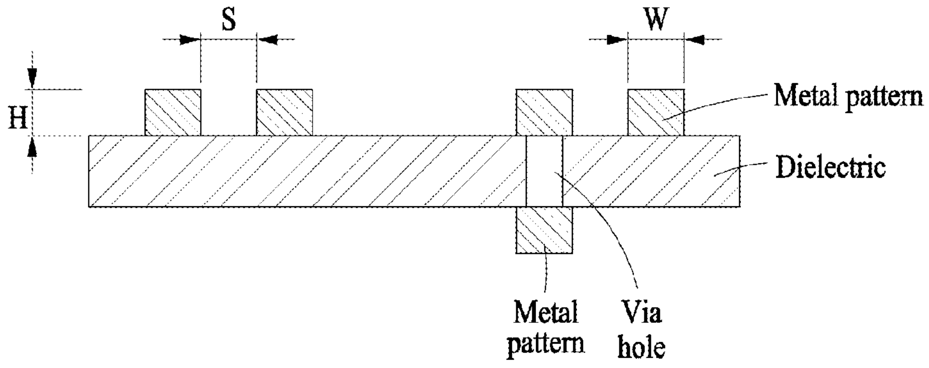

FIGS. 1A and 1B illustrate a structure of a spiral coil according to an example embodiment.

FIG. 1A illustrates the structure of the spiral coil according to an example embodiment. In the spiral coil, a conductive wire may be formed as a circle of a constant radius, and the spiral coil of such a structure may have advantages of improving the inductance by increasing the length of the conductive wire and being possible to be designed with conductive wires of different radii.

That is, a coil in which the same conductive wire is wound many times with the same diameter in order to increase the strength of the magnetic field is formed in a helical structure, physically having a plurality of layers, so it is difficult to embed the coil in a small device; however, a spiral coil of the structure illustrated in FIG. 1A has conductors of different radii, designed in a single-layer or two-layer structure, solving this problem. In this case, the distance from the center of the spiral coil to the first conductive wire may be illustrated as an inside diameter (Rin), and the distance to the last conductive wire may be illustrated as an external diameter (Rout).

FIG. 1B illustrates a cross-sectional structure of the spiral coil according to an example embodiment. Specifically, a cross-section of portion A-A' in FIG. 1A shows that in the case of a conductive wire wound N turns, a plurality of conductive wires may be arranged at constant intervals.

As shown in FIG. 1B, the height H of metal conductive wire patterns constituting each turn is equal to each other, and metal patterns in the upper and lower part of a dielectric may be electrically connected using a via hole. As described above, such a spiral coil has conductive wires of different current densities or resistance increasing due to current distributed to each surface of conductive wires facing each other; the resistance may be reduced by controlling a pitch S and width W of the conductive wire.

Figure 2A:
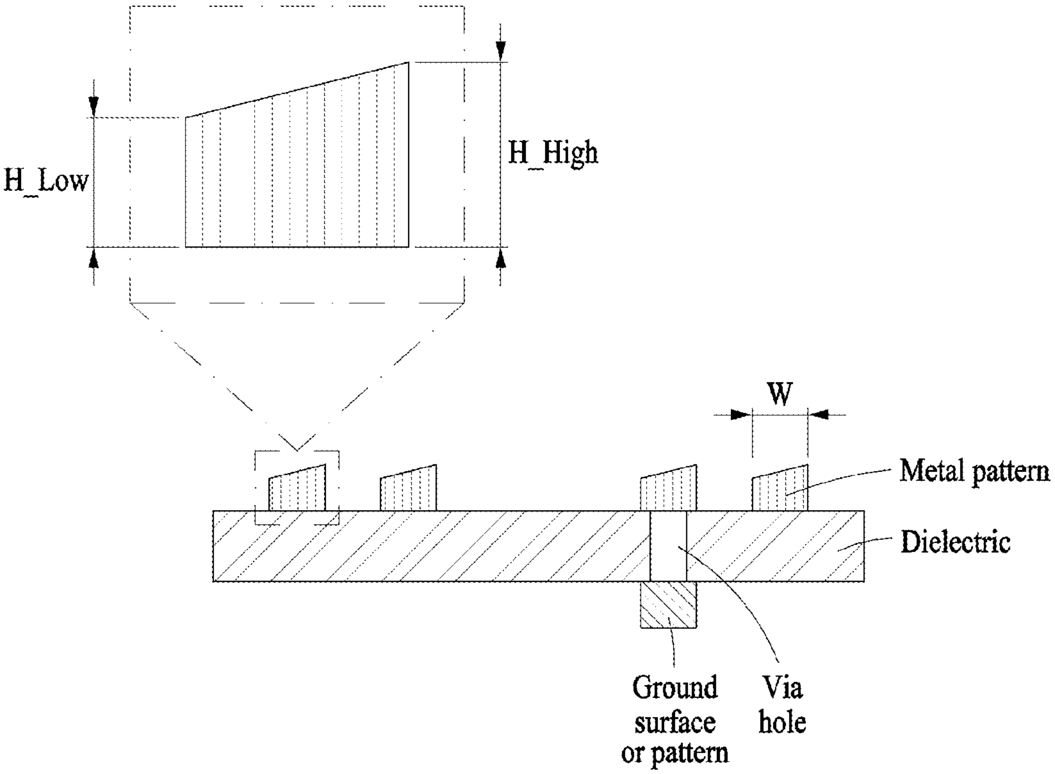
FIGS. 2A and 2B illustrate a shape of a spiral coil according to a first example embodiment.
Figure 2B:
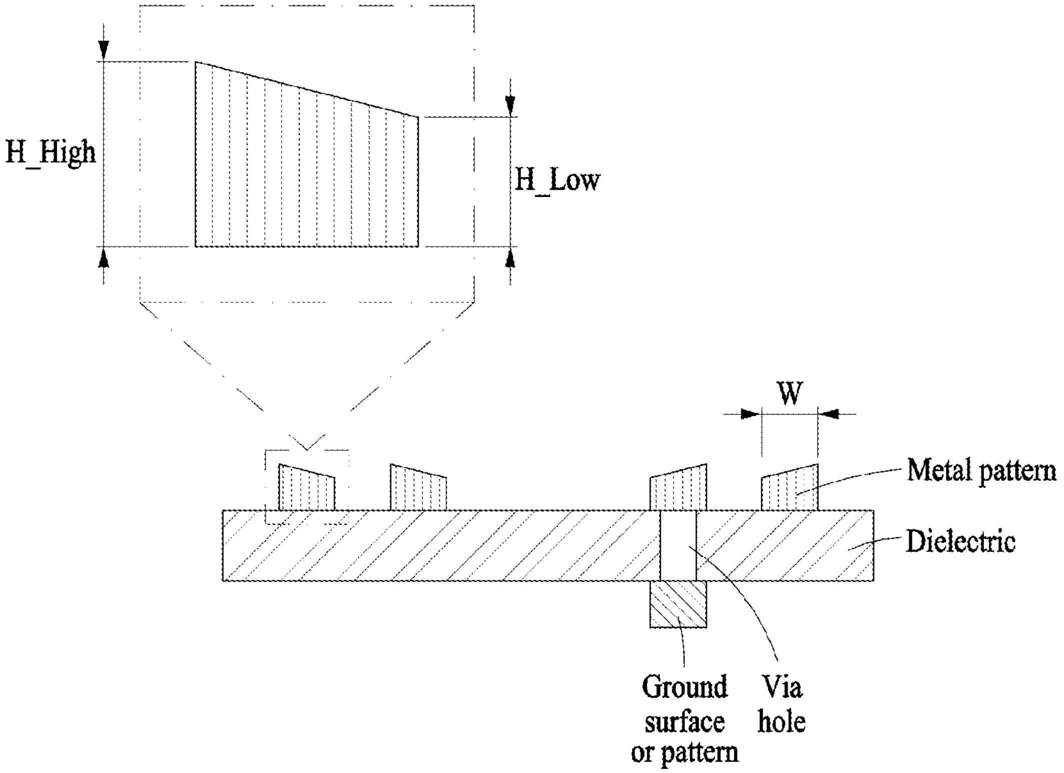

FIGS. 2A and 2B illustrate a shape of a spiral coil according to a first example embodiment.

The shape of the spiral coil according to the first example embodiment considers an imbalance of current due to eddy current; that is, a current distribution in which current density increases towards the center of the spiral coil and decreases towards the outside of the spiral coil, making the upper surface of the conductive wire have different height from each other and thus reduce resistance.

More specifically, in the case of the spiral coil according to the first example embodiment, a conductive wire disposed on the dielectric may have an inner surface close to the center of the coil based on the flat lower surface and an outer surface placed on the opposite of the inner surface with different heights from each other. In this case, the spiral coil according to the first example embodiment may be formed in a way that the vertical cross-section of the upper surface connecting the uppermost end of the inner and outer surfaces of the conductive wire has a constant height variation.

For example, the spiral coil according to the first example embodiment, as shown in FIG. 2A, may have an inner surface height H_High of the conductive wire close to the center of the coil formed to be higher than the opposite surface, which is an outer surface height H_Low, and such a shape of the conductive wire has an effect of reducing resistance.

In this case, the height difference H_High-H_Low between the inner surface of the coil closer to the center of the coil and the outer surface, which is the opposite surface, is proportional to the width W of the conductive wire but is not required to be linear.

Contrary to this, the spiral coil according to the first example embodiment, as shown in FIG. 2G, may have an outer surface height H_High of the conductive wire far from the center of the coil formed to be higher than the inner surface height H_Low, which is the opposite surface, and such a shape of the conductive wire has the effect of reducing resistance.

Similarly, the height difference H_High-H_Low of the outer surface of the conductive wire far from the center of the coil and the inner surface, which is the opposite surface, is proportional to the width W of the conductive wire, but is not required to be linear.

Figure 3A:
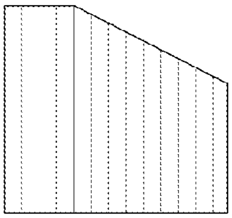
FIGS. 3A to 3C illustrate a shape of a spiral coil according to a second example embodiment.
Figure 3B:
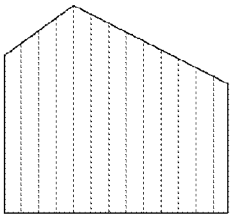
Figure 3C:
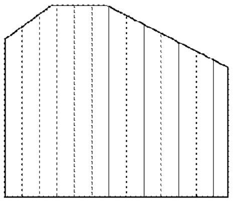

FIGS. 3A to 3C illustrate a shape of a spiral coil according to a second example embodiment.

The shape of the spiral coil according to the second example embodiment also provides a method of reducing the resistance of a conductive wire by resolving the problem of an imbalance of current caused by eddy currents.

More specifically, in the case of the spiral coil according to the second example embodiment, a conductive wire disposed on the dielectric may have an inner surface close to the center of the coil based on the flat lower surface and an outer surface placed on the opposite of the inner surface with different heights from each other. In this case, the spiral coil according to the second example embodiment may be formed in a way that the vertical cross-section of the upper surface connecting the uppermost end of the inner and outer surfaces of the conductive wire has a variable height variation.

For example, the spiral coil according to the second example embodiment, as shown in FIGS. 3A to 3C, may be implemented as a cross-section in which the vertical cross-section of the upper surface connecting the inner and outer surfaces of the conductive wire has a different height variation from each other. FIG. 3A illustrates a vertical cross-section of an upper surface having a height variation amount of 0 and then a negative height variation; FIG. 3B illustrates a vertical cross-section of an upper surface having a positive height variation and then a negative height variation, and FIG. 3C illustrates a vertical cross-section of an upper surface having a positive height variation, which is changed to 0 height variation, then to a negative height variation.

Such a shape of the conductive wire of the spiral coil implemented as a vertical cross-section of an upper surface of different height variations has an effect of reducing resistance. In this case, although FIGS. 3A to 3C illustrate three types of vertical cross-sections of the upper surface, the vertical cross-sections of the upper surface are not limited to the above three types, and may be implemented in various forms.

Figure 4A:
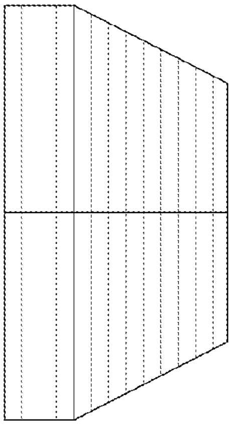
FIGS. 4A to 4C illustrate a shape of a spiral coil according to a third example embodiment.
Figure 4B:
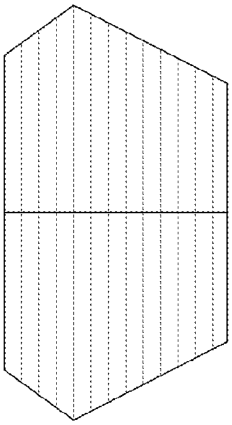
Figure 4C:
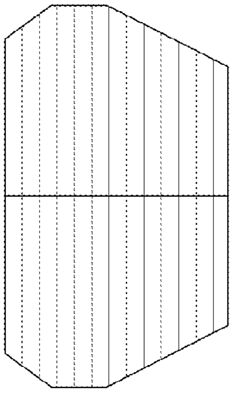

FIGS. 4A to 4C illustrate a shape of a spiral coil according to a third example embodiment.

The shape of the spiral coil according to the third example embodiment also provides a method of reducing the resistance of a conductive wire by resolving the problem of an imbalance of current caused by eddy currents.

More specifically, in the case of the spiral coil according to the third example embodiment, a conductive wire disposed on the dielectric, different from the first and second example embodiments, may have an inner surface close to the center of the coil based on an uneven lower surface and an outer surface placed on the opposite of the inner surface with different heights from each other. In this case, the spiral coil according to the third example embodiment may be formed in a way that the vertical cross-section of the upper surface connecting the uppermost end of the inner and outer surfaces of the conductive wire and a vertical cross-section of a lower surface connecting the lowermost end of the inner and outer surfaces have a variable height variation.

For example, the spiral coil according to the third example embodiment, as shown in FIG. 4A, FIG. 4B and FIG. 4C, may be implemented as a cross-section in which the vertical cross-section of the upper surface connecting the inner and outer surfaces of the conductive wire and a vertical cross-section of a lower surface connecting the lowermost end of the outer surface have a different height variation from each other.

In this case, the conductive wire of the spiral coil according to the third example embodiment may be formed in a shape in which the shape of the conductive wire according to the second example embodiment is mixed with each other.

As described above, the conductive wire of the spiral coil according to the first to third example embodiments may be manufactured using 3D metal printing, and when the size of the model is completely determined, the conductive wire may be mass-produced using a mold. Also, the manufactured conductive wire of the spiral coil may be directly attached to a dielectric by using an adhesive to a printed circuit board (PCB), and may be attached to a metal pattern of a shape or a portion of a shape of a conductive wire preformed in a PCB, by soldering or welding.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure but are not intended to limit the scope of the present disclosure. It will be apparent to those skilled in the art that various modifications based on the technical spirit of the present disclosure, as well as the disclosed example embodiments, can be made.

What is claimed is:

1. A spiral coil comprising:

a conductive wire wound N turns, wherein a portion of the conductive wire corresponding to each of the turns is formed in a way that an inner surface, close to a center of the spiral coil, and an outer surface, located on an opposite side of the inner surface, have different heights from each other based on a flat lower surface, and formed in a way that a vertical cross-section of an upper surface connecting an uppermost end of the inner and outer surfaces has a constant variation in height.

2. The spiral coil of claim 1, wherein the conductive wire has an inner surface of the spiral coil formed to be higher than an outer surface of the same.

3. The spiral coil of claim 1, wherein the conductive wire has an inner surface of the spiral coil formed to be lower than an outer surface of the same.

4. The spiral coil of claim 1, wherein a height difference between an inner surface and an outer surface of the spiral coil is proportional to a width of the conductive wire.

5. A spiral coil comprising:

a conductive wire wound N turns, wherein a portion of the conductive wire corresponding to each of the turns is formed in a way that an inner surface, close to a center of the spiral coil, and an outer surface, located on an opposite side of the inner surface, have different heights from each other based on a flat lower surface, and formed in a way that a vertical cross-section of an upper surface connecting an uppermost end of the inner and outer surfaces has a variable height variation, wherein a height difference between an inner surface and an outer surface of the spiral coil is proportional to a width of the conductive wire.

6. The spiral coil of claim 5, wherein the conductive wire has an inner surface of the spiral coil formed to be higher than an outer surface of the same.

7. The spiral coil of claim 5, wherein the conductive wire has an inner surface of the spiral coil formed to be lower than an outer surface of the same.

8. A spiral coil comprising:

a conductive wire wound N turns, wherein a portion of the conductive wire corresponding to each of the turns is formed in a way that an inner surface, close to a center of the spiral coil, and an outer surface, located on an opposite side of the inner surface have different heights from each other based on an uneven bottom surface, and formed in a way that a vertical cross-section of an upper surface connecting an uppermost end of the inner and outer surfaces and a vertical cross-section of a bottom surface connecting a lowermost end of the inner and outer surfaces have a variable height variation.

9. The spiral coil of claim 8, wherein the conductive wire has an inner surface of the spiral coil formed to be higher than an outer surface of the same.

10. The spiral coil of claim 8, wherein the conductive wire has an inner surface of the spiral coil formed to be lower than an outer surface of the same.

11. The spiral coil of claim 8, wherein a height difference between an inner surface and an outer surface of the spiral coil is proportional to a width of the conductive wire.

* * * * *